United States Patent [19]

Michaud

[11] 4,274,310

[45] Jun. 23, 1981

[54] TORQUE MULTIPLICATION DEVICE

[75] Inventor: Robert P. Michaud, Altamont, N.Y.

[73] Assignee: Roberta H. Wessendorf, Guilderland, N.Y.

[21] Appl. No.: 59,564

[22] Filed: Jul. 20, 1979

[51] Int. Cl.$^3$ .......................... B25B 13/00; G01L 5/24

[52] U.S. Cl. ................................ 81/57.36; 73/862.21; 81/57.30; 81/57.31

[58] Field of Search ............................ 73/136 B, 139; 81/57.31, 57.3, 57.36

[56] References Cited

U.S. PATENT DOCUMENTS

| | | | |
|---|---|---|---|
| Re. 29,993 | 5/1979 | Wagner | 81/57.31 |
| 1,762,515 | 6/1930 | Hiersch | 81/57.31 |
| 2,151,953 | 3/1939 | Zimmerman | 73/139 |
| 2,520,443 | 8/1950 | Seaquist | 81/57.31 |
| 3,108,472 | 10/1963 | Scyocurka | 73/139 |
| 3,905,254 | 9/1975 | Palatnick et al. | 81/57.3 |
| 3,992,964 | 11/1976 | Osmond | 81/57.31 |
| 4,060,137 | 11/1977 | Bickford et al. | 73/139 |
| 4,063,475 | 12/1977 | Perkins | 81/57.3 |
| 4,129,035 | 12/1978 | Ango | 73/139 |
| 4,212,196 | 7/1980 | Krieger et al. | 73/139 |
| 4,213,333 | 7/1980 | Krieger et al. | 73/139 |

*Primary Examiner*—Donald O. Woodiel

[57] ABSTRACT

Discloses a torque multiplication device for use in tightening or loosening a nut, lug, bolt head and the like, employing a planetary transmission of sun, planet and orbit gear means which multiplies the applied torque input to produce an output torque to facilitate and simplify such tightening or loosening. Brake means incorporated with the device prevents rotation of the orbit gear means.

A modification of the invention discloses an extensible brake arm which has an anchoring socket for securement with another nut, lug, bolt head and the like to likewise prevent rotation of the orbit gear means.

Another modification of the invention discloses two sets of sun, planet and orbit gear means having one common, drive output to produce uniform and balanced drive output.

Another modification of the invention discloses a ring-like brake arm having a plurality of anchoring sockets for locking securement with the lugs of a motor-vehicle wheel.

Also disclosed in a torque measuring device for use in measuring the magnitude of output torque being transmitted by the output drive means so that a human operator can thereby control the magnitude of such torque being applied to prevent a nut or bolt head from being sheared off through excess application of torque.

11 Claims, 24 Drawing Figures

FIG. 3.
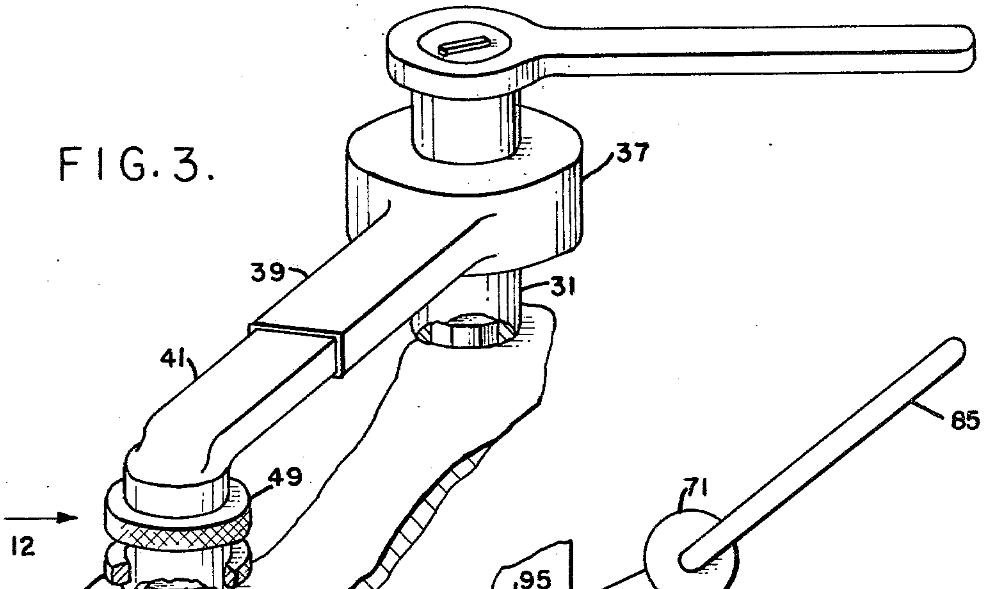
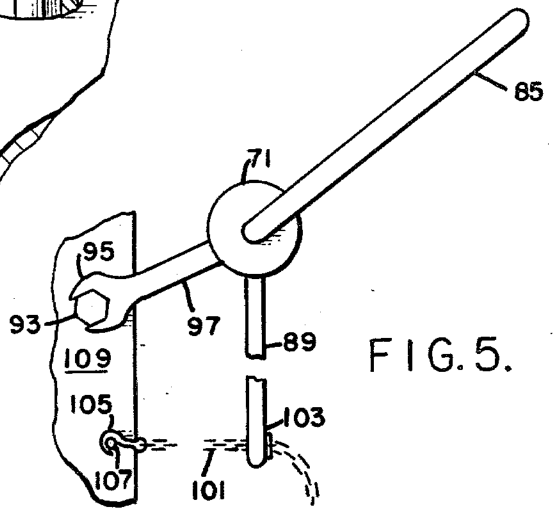
FIG. 5.
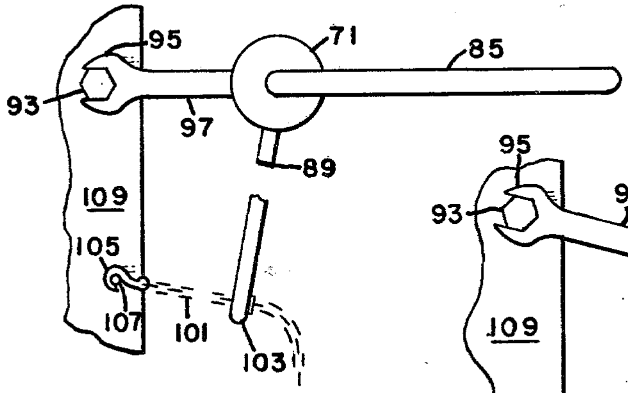
FIG. 6.
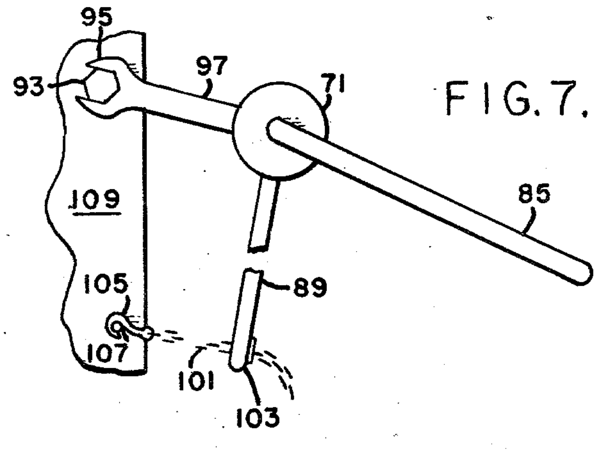
FIG. 7.

FIG. 4.
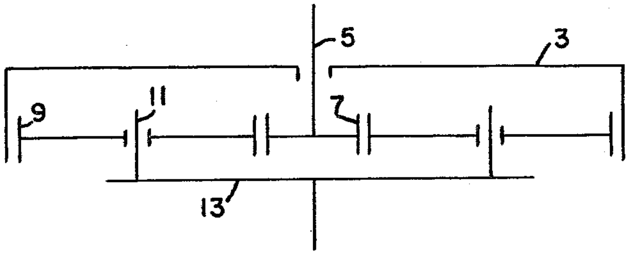
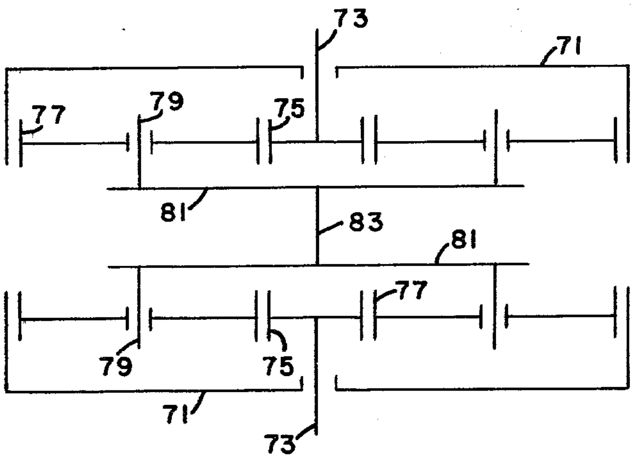
FIG. 11.
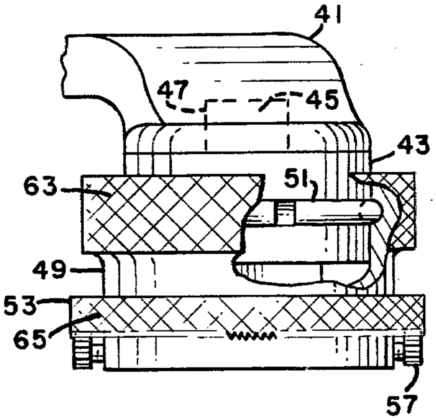
FIG. 12.
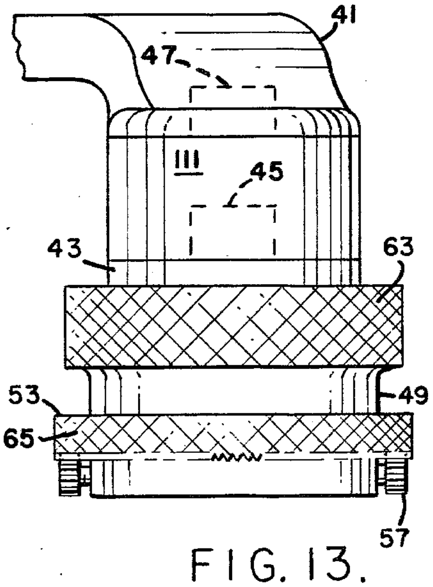
FIG. 13.

TORQUE MULTIPLICATION DEVICE

BRIEF SUMMARY OF THE INVENTION

This invention relates to the field of hand tools for use in tightening or loosening nuts, lugs, bolt heads and the like. The object of this invention is to provide a torque multiplication device for such intended use and which employs a planetary transmission of sun, planet and orbit gear means which multiplies the input torque which the human operator applies to produce a significant output torque which allows a nut, lug, bolt head and the like to be easily and simply tightened or loosened. To produce such an output torque constituting an input torque applied to the transmission and multiplied by a multiplication factor through such transmission, brake means must be employed to brake the orbit gear means to prevent same from rotating. To this end the the brake means is independent of the human operator and comprises an offset brake arm adapted for securement with an anchoring object. Of course, such multiplication factor will depend upon the relative radii of the sun and planet gears incorporated into the device. If the radius of such planet gear means is 4 times that of the sun, the resulting torque multiplication factor would be 10. The brake arm is offset to maximize stability in preventing the device from tipping off a nut, for example, when tightening or loosening same. Additional structure is employed to provide further stability.

In a modification of the invention, an extensible brake arm is employed that has an anchoring socket for securement with another nut, lug, bolt head and the like. The anchoring socket has a ring gear which advances locking screws inwardly against the faces of such other nut, lug or bolt head to effect locking securement therewith of such anchoring socket.

In another modification of the invention, two sets of sun, planet and orbit gear means are employed having one common, drive output to produce a uniform and balanced drive output. To this end the torque input is applied by the human operator through a drive handle having two forks, each operatively connected to the sun gear means of a respective set, and the brake arm has two forks, each operatively connected to the orbit gear means of a respective set.

In another modification of the invention, the brake means comprises a brake arm of a ring-like configuration. Such brake arm has a plurality of anchoring sockets that can be locked onto the lugs of a motor-vehicle wheel. Each of the anchoring sockets is independently adjustable relative to the brake arm. Each of the anchoring sockets has a ring gear operatively engaged with locking screws which allow the locking screws to advance inwardly against the faces of the lugs to effect locking securement therewith of such anchoring sockets.

Also provided is a torque measuring device for use in measuring the magnitude of output torque being transmitted by the output drive means so that the human operator can control the magnitude of such torque he is applying to prevent a nut or bolt head from being sheared off. To this end an upper and lower casing carry and mount a steel-band spring biasing such upper casing in a counterclockwise direction relative to such lower casing. Output torque will cause the spring to wind around a cylinder of such lower casing with relative movement of such upper and lower casings thereby producing a reading through an indicator mark and indicia as to the magnitude of such output torque.

BRIEF DESCRIPTION OF THE DRAWINGS

FIG. 3 is another view of the invention shown in FIG. 2;

FIG. 4 is a diagrammatic view of the transmission employed in the invention shown in FIGS. 1, 2, 3, 16 and 21;

FIG. 5 is a view of a modification of the invention;

FIGS. 6, 7 and 8 are other views of the invention shown in FIG. 5;

FIG. 11 is a diagramammatic view of the transmission employed in the invention shown in FIGS. 5, 6, 7, 8, 9 and 10;

FIG. 12 is a view taken in the direction of the arrow 12 in FIG. 3;

FIG. 13 is a view of the structure of FIG. 12 and shows an extension being utilized;

DETAILED DESCRIPTION

Figure 1:
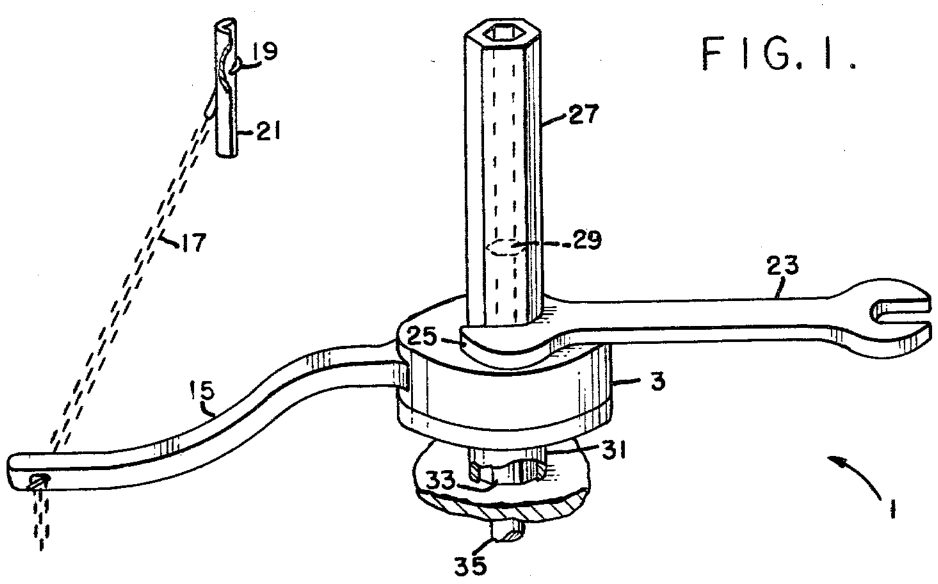
FIG. 1 is a view of the invention.

In FIG. 1 of the drawings, reference numeral 1 generally refers to the invention of the torque multiplication device. It should be noted that the axial height of the torque multiplication device 1 shown in FIG. 1—and similarly with respect to the other modifications of such torque multiplication devices—is somewhat exaggerated to show detail. Ideally the axial height of such torque multiplication device should be kept to a minimum to maximize stability when using same. Housing 3 freely mounts a drive shaft 5. Drive shaft 5 has fixed thereto a spur-type, sun gear 7. Sun gear 7 is operatively engaged with and meshes with three planet gears 9, only two of which are shown in FIG. 4. Planet gears 9 are freely mounted for rotary movement on upstanding pintles 11 of a spider output drive 13. Planet gears 9 operatively engage and mesh with the internal ring gear or orbit gear integrally formed of housing 3.

Transversely projecting from and fixed to housing 3 is an offset brake arm 15. A brake chain 17, disposed through and secured with brake arm 15, has its hook end 19 engaged in secured relationship with an anchoring object 21 to thereby prevent housing 3 and hence its integral orbit gear from rotating in a counterclockwise direction, as viewed looking down upon housing 3. Open-end wrench 23 has one of its open ends 25 operatively engaged with the hexagonally-faced, elongated stabilizing socket 27 operatively engaged with the upstanding hexagonally-shaped drive end 29 of drive shaft 5. The spider output drive 13 operatively engages a socket 31 operatively engaged with a nut 33 to be tightened on a threaded stud 35, or loosened therefrom.

With socket 31 engaged with nut 33 and open-end wrench 23 rotated in a clockwise direction, housing 3 will rotate in a counterclockwise direction unless restrained or braked against such rotation. With housing 3 braked as shown in FIG. 1, clockwise rotation of open-end wrench 23 will effect clockwise drive of socket 31 with nut 33 being tightened through a torque multiplication factor depending upon the relative radii of the sun gear 7 and planet gears 9 and the force transmitted through the open-end wrench 23.

For example, a torque multiplication factor of 10 would be achieved if the radius of a planet gear is 4 times that of a sun gear, and with the internal ring gear or orbit gear of housing 3 being braked.

Brake arm 15 should be offset to such extent that the connection of brake chain 17 therewith will lie approximately in the same horizontal plane as the bottom of socket 31 so that the reacting brake-force component will be in the same plane as nut 33 being tightened to maximize stability and thereby to prevent any tipping moment from arising to tip socket 31 off nut 33. Such tipping moment would result when torque is applied by open-end wrench 23 in the tightening or loosening operations. Similarly, further stability is provided by means of the human operator's physically grasping in his left hand such elongated socket 27 to thereby prevent the described phenomenon of such tipping moment from arising. As a point of further clarification, minimizing the axial height of such torque multiplication device to maximize stability means keeping to a minimum the distance between the planes within which open-end wrench 23 applies input torque, within which socket 31 applies output torque to tighten nut 33 and the plane of the reacting brake-force component.

Figure 2:
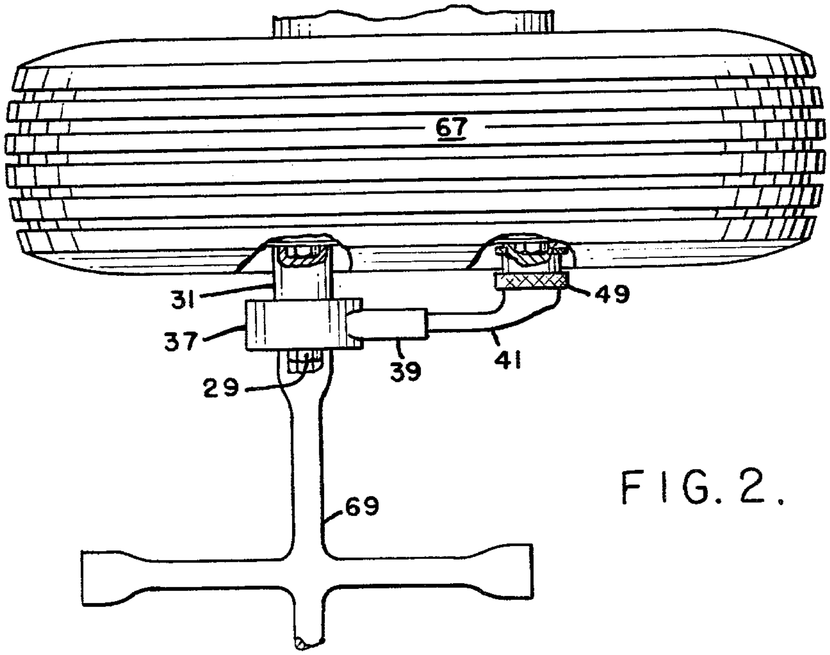
FIG. 2 is a view of a modification of the invention.
Figure 8:
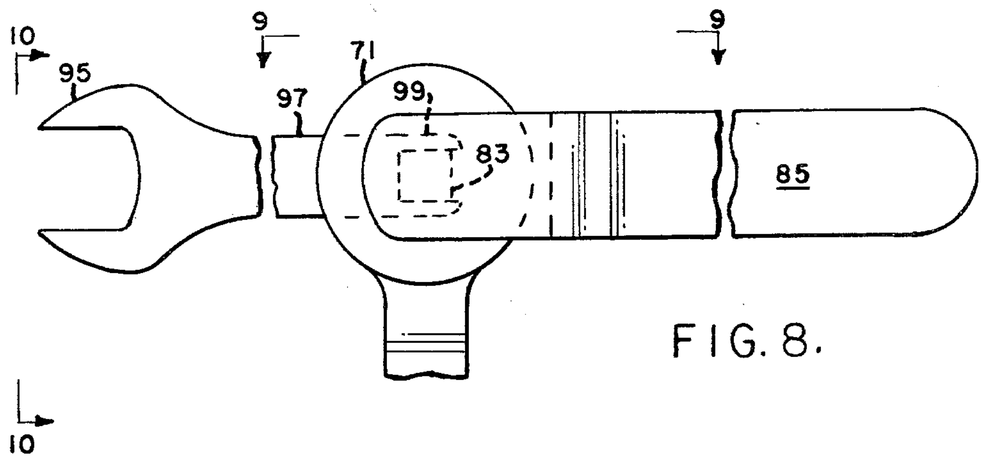
Figure 9:
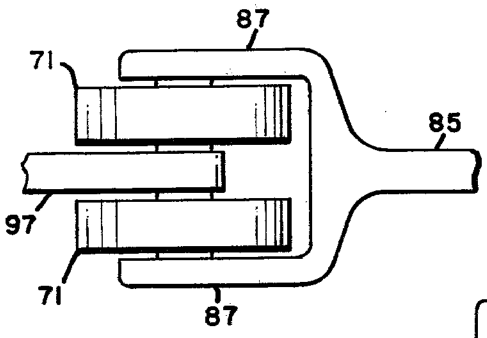
FIG. 9 is a view taken in the direction of the arrows 9—9 in FIG. 8.
Figure 10:
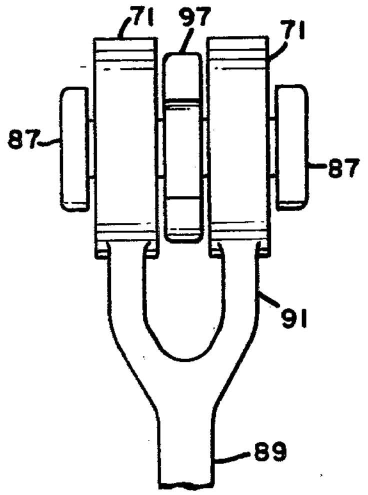
FIG. 10 is a view taken in the direction of the arrows 10—10 in FIG. 8.
Figure 14:
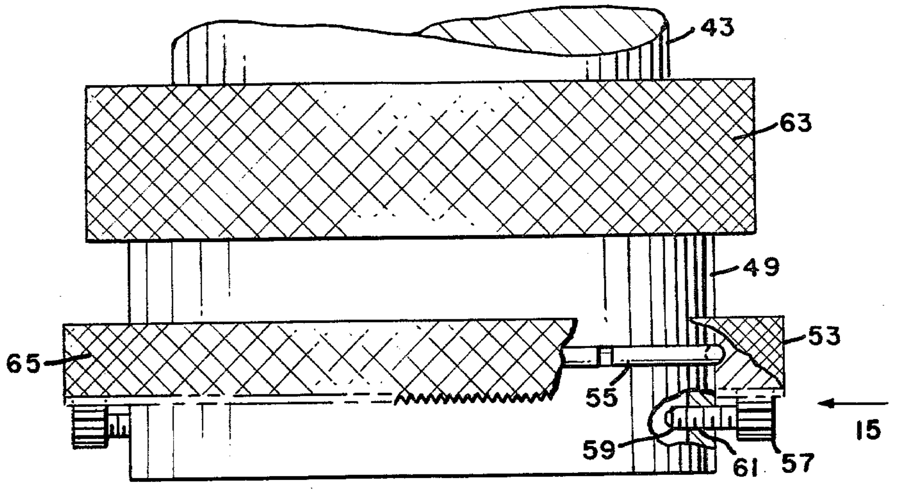
FIG. 14 is a partial blown-up view of the detail in FIG. 12.
Figure 15:
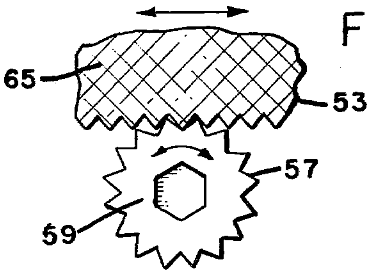
FIG. 15 is a view taken in the direction of the arrow 15 in FIG. 14.
Figure 16:
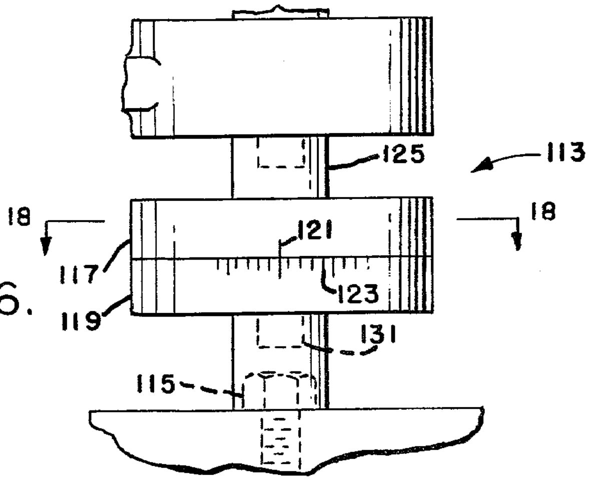
FIG. 16 shows a torque measuring assembly that can be employed with the invention shown in FIGS. 1, 2 and 3.
Figure 17:
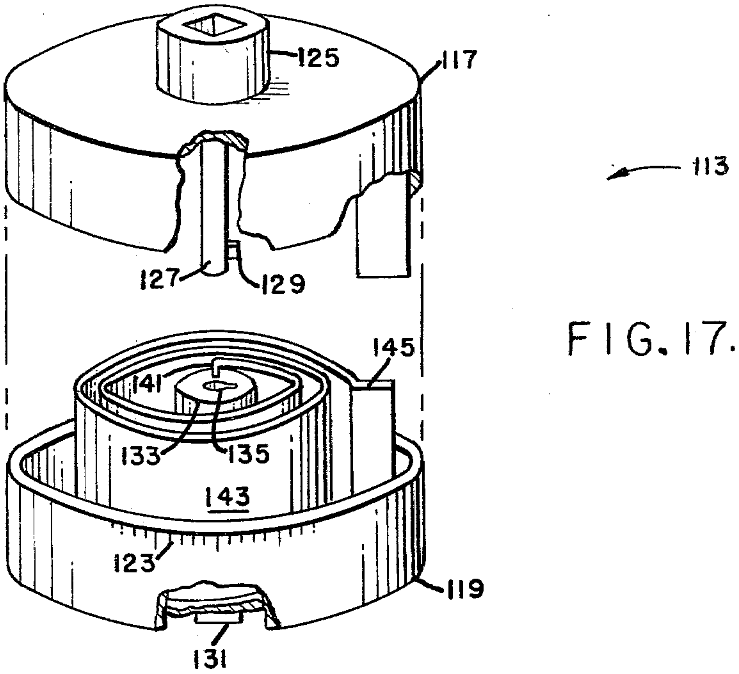
FIG. 17 is an exploded assembly view of the torque measuring assembly shown in FIG. 16.
Figure 19:
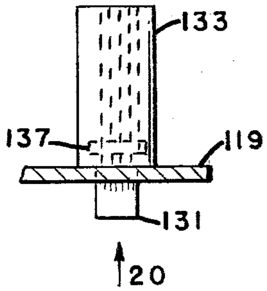
FIG. 19 is a more detailed view of part of FIG. 17.
Figure 20:
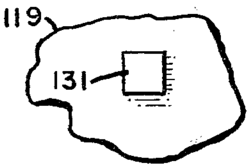
FIG. 20 is a view in the direction of the arrows 20 in FIG. 19.
Figure 18:
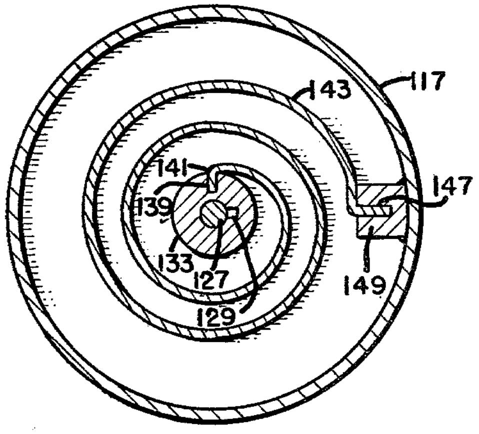
FIG. 18 is a sectional view taken in the direction of the arrows 18—18 in FIG. 16.
Figure 21:
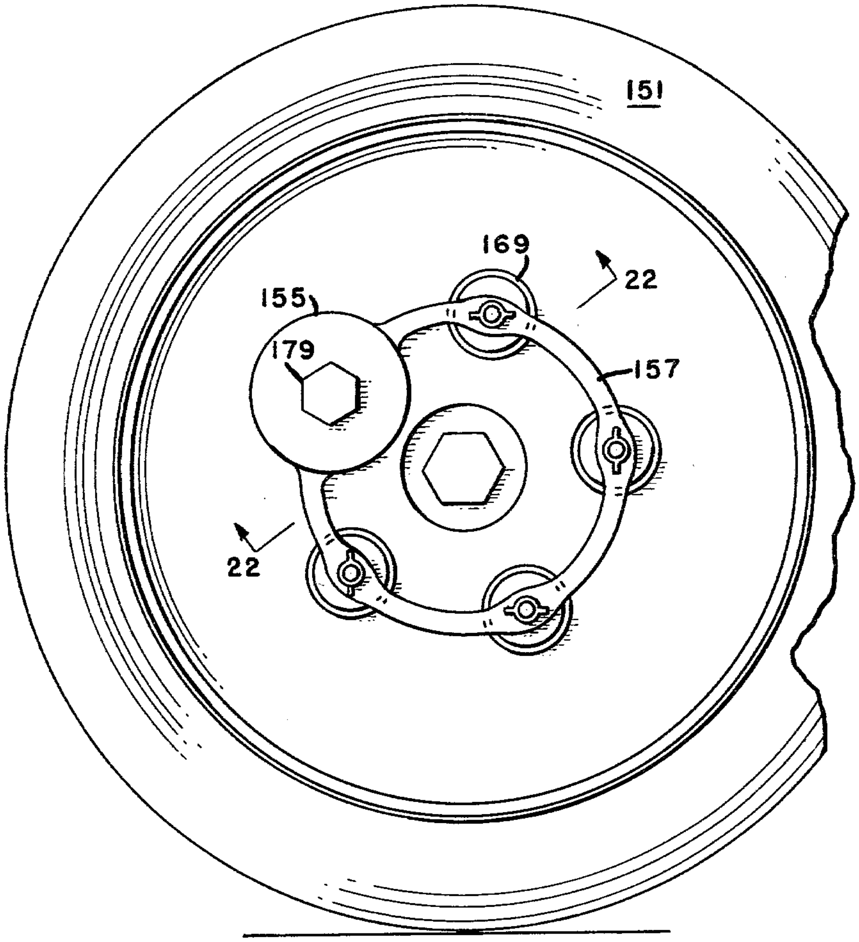
FIG. 21 is a view of another modification of the invention.
Figure 22:
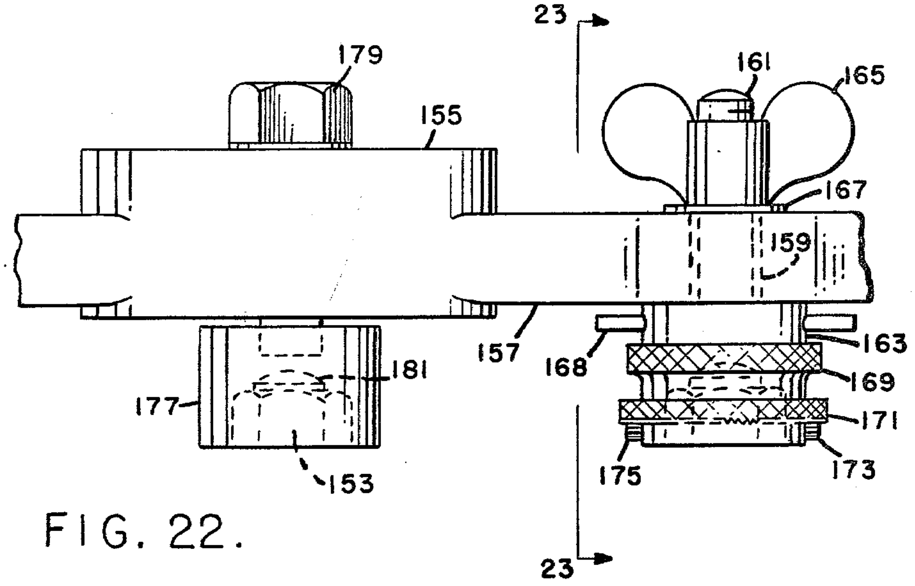
FIG. 22 is a view in the direction of the arrows 22—22 in FIG. 21.
Figure 23:
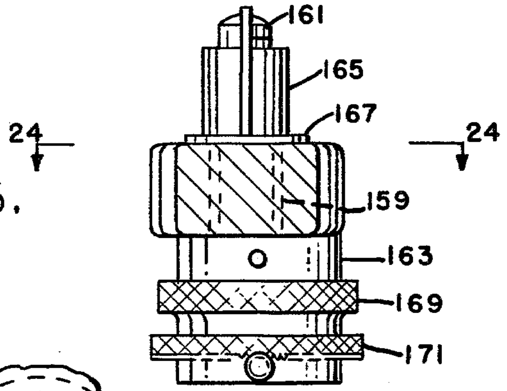
FIG. 23 is a view in the direction of the arrows 23—23 in FIG. 22.
Figure 24:
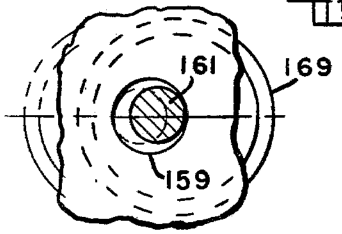
FIG. 24 is a view in the direction of the arrows 24—24 in FIG. 23.

In FIGS. 2 and 3, the torque multiplication device differs from the device shown and described with reference to FIG. 1 in that an offset brake arm 15 and brake chain 17 are not employed. Instead, transversely projecting from housing 37 is an extensible brake arm. Such extensible brake arm comprises a rectangularly-shaped female tubing member 39 integral with housing 37 and which receives a complemental male element 41.

An intermediate element 43 is removably connected to male element 41 by means of a square male end 45 integral with and upstanding from intermediate element 43 which is received in a complemental female opening 47 in male element 41. An anchoring socket 49 is freely mounted in a rotary direction relative to intermediate element 43 by means of a split-ring 51 disposed in common grooves formed in intermediate element 43 and anchoring socket 49. A ring gear 53 similarly is freely mounted in a rotary direction relative to anchoring socket 51 by means of a split-ring 55 disposed in common grooves formed in anchoring socket 49 and ring gear 53. Ring gear 53 is in operative engagement with the geared ends 57 of locking screws 59 engaged with transversely tapped holes 61 formed in anchoring socket 49. Knurling 63 is provided on anchoring socket 49 to facilitate manipulation thereof; and knurling 65 is similarly provided on ring gear 53.

FIGS. 12, 13, 14 and 15 show in greater detail the intermediate element 43, anchoring socket 49 and ring gear 53. FIG. 13 also shows an extension 111 interposed between male element 41 and inermediate element 43 for use in allowing anchoring socket 49 to engage a nut or bolt head that is recessed, or to accommodate the vertical spatial necessity arising when the torque measuring assembly 113 is employed.

FG. 2 shows the device for use in tightening or loosening the lugs of a motor-vehicle wheel 67. Socket 31 is appropriately disposed for operative engagement with a lug to be tightened or loosened. Male element 41 is appropriately extended or shortened to dispose anchoring socket 49 for operative engagement with another lug. Anchoring socket 49 is appropriately aligned to engage such other lug and be disposed for and in engagement with such other lug; and the ring gear 53 is rotated in a counterclockwise direction to advance locking screws 59 inwardly against the faces of such lug to thereby lock anchoring socket 49 on such lug (for purposes of preventing it from "popping off" when the anchoring socket 49 applies shear stress) and thereby to brake housing 37 and the internal ring gear or orbit gear integrally formed of or otherwise fixed to housing 37.

In using the device shown in FIG. 2, a lug wrench 69 is appropriately disposed for operative engagement with drive end 29 and is thereupon rotated in a clockwise or counterclockwise direction to tighten or loosen the lug, respectively. It should be noted that the drive end 29 of shaft 5 in FIG. 1 extends further above the housing 3 than the drive end 29 shown in FIG. 2.

After a lug has been loosened, the device can be appropriately moved about to lock anchoring socket 49 on such loosened but unremoved lug and to appropriately engage socket 31 with another lug to soosen same.

Similarly, in using the device shown in FIG. 2 to tighten lugs, the lugs can be initially started by hand and thereafter the device can be appropriately disposed for operative engagement with two of such started lugs. And after the device is used to tighten one lug, it can then be appropriately moved about to tighten the next and succeeding lugs.

FIG. 3 depicts the device, shown and described in FIG. 2, being used to tighten or loosen nuts or bolts. In FIG. 3, a socket wrench and drive socket are employed instead of the lug wrench 69.

FIGS. 5, 6, 7, 8, 9, 10 and 11 relate to the same modification of the torque multiplication device. FIGS. 5, 6 and 7 show the starting, middle and terminal positions, respectively, of the device in a tightening operation. Two housings 71 freely mount two drive shafts 73. Each drive shaft 73 has fixed thereto a spur-type, sun gear 75. Each sun gear 75 operatively engages and meshes with a set of three planet gears 77, but only two of the planet gears 77 of each set are shown in FIG. 11. Planet gears 77 are freely mounted on upstanding pintles 79 of two spider output drives 81 which have one common, square-shaped, output drive end 83. The planet gears 77 of each set operatively engage the respective internal ring gear or orbit gear integrally formed of each of the housings 71.

A drive handle 85 has two forks 87, each of which is operatively connected to a drive shaft 73. A brake arm 89 has two forks 91, each of which transversely extends from its associated housing 71.

FIGS. 5, 6 and 7 show the device being used to tighten a nut or bolt head 93. One end 95 of an open-end wrench 97 is shown engaged with nut 93 and its other open end 99 is shown operatively engaged with the common, square-shaped, output drive end 83. A brake chain 101, adjustably disposed through and secured with the open end 103 of brake arm 89, has its hook end 105 engaged in secured relationship with a pin 107 upstanding from support structure 109 to thereby prevent the housings 71 from rotating in a counterclockwise direction when drive handle 85 is rotated in a clockwise direction to effect tightening of nut 93.

In addition to the ease with which nuts or bolt heads can be tightened or loosened by employing the torque multiplication device, the modification shown and described with reference to FIGS. 5, 6, 7, 8, 9, 10 and 11 has the resulting functional advantage of effecting uniform drive output and of preventing unbalanced output forces from being applied to and transmitted to open-end wrench 97, and, hence, to any nut or bolt head being tightened or loosened. Because the drive output which drive end 83 transmits is uniform and balanced, no resulting twisting torque occurs with respect to drive end 83. This means that since the output drive which drive end 83 transmits through wrench 97 is uniform and balanced, there is little likelihood that end 95 of open-end wrench 97 will twist off the nut or bolt head being tightened or loosened.

FIGS. 16, 17, 18, 19 and 20 show a torque multiplication device having a torque measuring assembly or device generally referred to by reference numeral 113 interposed between the drive end of the torque multiplication device and the nut or bolt head 115 to be tightened. The torque multiplication device utilized can be of the type used in FIGS. 1, 2 and 3.

Such torque measuring assembly 113 comprises an upper casing 117 and a lower casing 119. Upper casing 117 has an indicator mark 121 and lower casing 119 has appropriate indicia 123 thereon to indicate the amount of torque that is being applied by the torque multiplication device.

For reason of the ease with which nuts or bolt heads can be tightened by employing the torque multiplication device, it is understandably important to have such a torque measuring assembly 113 for the human operator to be able to measure and hence control the magnitude of the torque being applied, to prevent a nut or bolt head from being sheared off for reason of excess application of torque. Upper casing 117 has upstanding therefrom a female socket drive head 125 and a vertical aligning spindle 127 with a spring-biased (not shown) locking nub 129 urged outwardly. Lower casing 119 has a male drive head 131 depending therefrom and upstanding centrally therefrom a spring-core cylinder 133. Spring-core cylinder 133 has a keyhole-type opening 135 formed therethrough. Opening 135 complementally receives therethrough spindle 127 with locking nub 129 partially compressed against the outwardly biasing action of its spring acting upon nub 129.

Upon spindle 127 being disposed through the keyhole-type opening 135, locking nub 129 is fully relieved and, by its restored spring, returned outwardly within the locking chamber 137 formed at the bottom of opening 135 and thereby locks upper casing 117 and lower casing 119 together except for relative rotary motion therebetween.

Spring-core cylinder 133 has a vertical slot 139 which fixedly receives therein the inner ear 141 of a steel-band spring 143 whose outer ear 145 is fixedly received within a vertical slot 147 formed in an integral abutment 149 projecting inwardly of upper casing 117. Spring 143 biases upper casing 117 in a counterclockwise direction relative to lower casing 119.

The torque applied by the human operator by means of the open-end wrench, socket wrench or lug wrench is multiplied by the torque multiplication device to provide a resulting torque or output torque depending, of course, upon the torque multiplication factor of the transmission of such device. Such output torque will cause spring 143 to wind around cylinder 133 with clockwise movement of upper casing 117 relative to lower casing 119, and with indicator mark 121 providing a reading as to the magnitude of such output torque with respect to indicia 123.

Upon a certain magnitude of output torque being transmitted, spindle 127 could bind with cylinder 133 from relative twisting of upper and lower casings 117 and 119. To correct such kind of problem, two steel-band springs, each half the height of spring 143, can be employed for stability and to minimize such relative twisting. The first or upper steel-band spring would be placed where spring 143 is shown placed but would occupy only the upper half of the space that spring 143 occupies. The second or lower steel-band spring would be placed beneath such upper steel-band spring, and with its inner ear similarly fixed to cylinder 133 directly opposite to where the inner ear of the upper spring is fixed and with its outer ear similarly fixed to another vertical abutment directly opposite to where the outer ear of the upper spring would be fixed.

FIGS. 21, 22, 23 and 24 show a torque multiplication device for emplacement on a motor-vehicle wheel 151 having five lugs 153 for purposes of tightening or loosening same. In FIGS. 21, 22, 23 and 24, the torque multiplication device differs from the devices shown and described in FIGS. 1, 2 and 3 in that the housing 155 does not have an offset brake arm 15 and brake chain 17, nor does the housing 155 have any extensible brake arm of an integral female tubing member 39 receiving therein complemental male element 41. Instead, integral with and transversely projecting from housing 155 is a brake arm 157 somewhat ring-like in configuration.

Brake arm 157 has formed therethrough four holes 159, each of which receives therethrough a threaded shaft 161 integral with and upstanding from intermediate element 163 and eccentric relative to element 163. A wing nut 165 engaged with threaded shaft 161 and an interposed thrust washer 167 secures intermediate element 163 on brake arm 157. To facilitate securing intermediate element 163 on brake arm 157, finger spokes 168 are grasped by one of the human operator's hands while tightening wing nut 165 with his other hand. Such finger spokes 168 are integral with or otherwise fixed to intermediate element 163 and transversely project therefrom. Each hole 159 is oversize relative to threaded shaft 161 to thereby afford combined eccentric disposition and adjustment of intermediate element 163 relative to brake arm 157.

Anchoring socket 169 is freely mounted in a rotary direction relative to intermediate element 163 similar to the mounting of anchoring socket 49 relative to intermediate element 43. Ring gear 171 is freely mounted in a rotary direction relative to anchoring socket 169 similar to the mounting of ring gear 53 relative to anchoring socket 49. Ring gear 171 is in operative engagement with the geared ends 173 of locking screws 175 similar to the operative engagement of ring gear 53 with the geared ends 57 of locking screws 59.

Using four anchoring sockets 169 secured to their respective lugs 153 assures that brake arm 157 and drive socket 177 will remain engaged with their respective lugs 153 in both the tightening and loosening operations, and, in addition, there is more stability to the torque multiplication device anchored with four anchoring sockets 169.

In using the torque multiplication device, the threaded shafts 161 are appropriately adjusted and secured with brake arm 157 such that the four anchoring sockets 169 and the drive socket 177 will be aligned with respect to the bolt-hole circle of the wheel 151 represented by such projecting wheel studs. Since the bolt-hole circle and, hence, the wheel studs are standard for certain vehicles, once the four anchoring sockets 169 have been adjusted for such alignment, threafter no further adjustment of the four anchoring sockets 169 relative to brake arm 157 will be necessary.

To loosen the five lugs 153, drive socket 177 is engaged with one of the lugs 153 and each of the anchoring sockets 169 is appropriately rotated relative to its intermediate element 163 to align such anchoring socket 169 for engagement with its respective lug 153. The ring gears 171 are rotated in a counterclockwise direction to advance inwardly and lock the locking screws 175 against the faces of lugs 153. Then either a lug wrench or a socket wrench with a drive socket is appropriately engaged with the drive end 179 of the torque muliplication device and is rotated in a counterclockwise direction to loosen such lug 153. Then the anchoring sockets 169 are appropriately unlocked from their respective lugs 153. Next the drive socket 177 is shifted for engagement with another lug to be loosened and the anchoring sockets 169 are again appropriately engaged with and locked upon the other lugs 153. This loosening operation is repeated until all the lugs 153 have been loosened.

In the tightening operation, the lugs 153 are first hand-tightened on the wheel studs 181. Then the drive socket 177 is engaged with one of the lugs 153 and the anchoring sockets 169 are engaged with and locked upon the remaining lugs 153. Next drive end 179 of the torque multiplication device is rotated in a clockwise direction to tighten such lug 153. Then anchoring sockets 169 are unlocked from their respective lugs 153. Next drive socket 177 is shifted and engaged with another lug 153 to be tightened and the anchoring sockets 169 are engaged with and locked upon the other lugs 153. This tightening operation is repeated until all the lugs 153 have been tightened.

With a motor-vehicle wheel mounted with four lugs, the torque multiplication device would have a brake arm of corresponding configuration and three anchoring sockets would be employed.

Having thusly described my invention, I claim:

1. A torque multiplication device for use in tightening or loosening a nut, lug, bolt head and the like; said torque multiplication device comprising planetary transmission means of operatively engaged sun, planet and orbit gear means for producing an output torque constituting an input torque applied to said transmission means and multiplied by a multiplication factor through said transmission means, said transmission means having input drive means to receive such applied torque input and output drive means to transmit such output torque to said nut, lug, bolt head and the like for tightening or loosening same, and brake means for braking said orbit gear means, said brake means carrying an anchoring socket for securement with another nut, lug, bolt head and the like to brake said orbit gear means, said anchoring socket carrying locking screw means, said anchoring socket freely mounting in a rotary direction a ring gear, said ring gear operatively engaging said locking screw means to advance inwardly said locking screw means for locking engagement of said locking screw means with the faces of such another nut, lug, bolt head and the like or to withdraw outwardly said locking screw means for release from such locking engagement.

2. A torque multiplication device for use in tightening or loosening a nut, lug, bolt head and the like; said torque multiplication device comprising planetary transmission means of operatively engaged sun, planet and orbit gear means for producing an output torque constituting an input torque applied to said transmission means and multiplied by a multiplication factor through said transmission means, said transmission means having input drive means to receive such applied torque input and output drive means to transmit such output torque to said nut, lug, bolt head and the like for tightening or loosening same, and brake means for braking said orbit gear means, said planetary transmission means comprising two sets of sun, planet and orbit gear means, said output drive means being one common, output drive means for transmitting such output torque and having thereby the resulting functional advantage of effecting uniform drive output and of preventing unbalanced output forces from being applied to such output drive means or from being transmitted therefrom.

3. A torque multiplication device in accordance with claim 2, wherein is further provided two housings, each of which carries said orbit gear means, wherein said brake means comprises a brake arm having two forks, and wherein each of said housings carries a brake-arm fork.

4. A torque multiplication device in accordance with claim 3, wherein is further provided a drive handle having two forks, and wherein each of said drive-handle forks is operatively connected to said input drive means of said transmission means to apply torque input thereto.

5. A torque multiplication device in accordance with claim 2, wherein is further provided two housings, each of which carries one of said orbit gear means, wherein said brake means comprises a brake arm having two forks, wherein each of said housings carries a brake-arm fork, wherein is further provided a drive handle having two forks and wherein each of said drive-handle forks is operatively connected to said input drive means of said transmission means to apply torque input thereto.

6. A torque multiplication device for use in tightening or loosening a nut, lug, bolt head and the like; said torque multiplication device comprising planetary transmission means of operatively engaged sun, planet and orbit gear means for producing an output torque constituting an input torque applied to said transmission means and multiplied by a multiplication factor through said transmission means, said transmission means having input drive means to receive such applied torque input and output drive means to transmit such output torque to said nut, lug, bolt head and the like for tightening or loosening same, and brake means for braking said orbit gear means, said brake means carrying a plurality of intermediate elements, anchoring sockets, ring gears and locking screw means, each of said anchoring sockets freely mounting in a rotary direction one of said ring gears, each of said ring gears operatively engaging said locking screw means to advance inwardly said locking screw means for locking engagement of said locking screw means with the faces of such other nut, lug, bolt head and the like or to withdraw outwardly said locking screw means for release from such locking engagement.

7. A torque multiplication device for use in tightening or loosening a nut, lug, bolt head and the like; said torque multiplication device comprising planetary transmission means of operatively engaged sun, planet and orbit gear means for producing an output torque constituting an input torque applied to said transmission means and multiplied by a multiplication factor through said transmission means, said transmission means having input drive means to receive such applied torque input and output drive means to transmit such output torque to said nut, lug, bolt head and the like for tightening or loosening same, and brake means for braking said orbit gear means, said brake means comprising a plurality of intermediate elements and anchoring sockets, each of said intermediate elements freely mounting in a rotary direction one of said anchoring sockets, said brake means further comprising a brake arm, said brake arm having holes formed therethrough, each of said intermediate elements carrying a shaft in eccentric relationship, and each of said brakearm holes receiving said shaft of said intermediate element.

8. A torque multiplication device in accordance with claim 7, wherein said intermediate elements have finger spokes, and wherein said finger spokes are adapted to being grasped by a human operator's hand to facilitate mounting said intermediate elements on said brake arm.

9. A torque multiplication device for use in tightening or loosening a nut, lug, bolt head and the like; said torque multiplication device comprising planetary transmission means of operatively engaged sun, planet and orbit gear means for producing an output torque consistuting an input torque applied to said transmission means and multiplied by a multiplication factor through said transmission means, said transmission means having input drive means to receive such applied torque input and output drive means to transmit such output torque to said nut, lug, bolt head and the like to tightening or loosening same, and brake means for braking said orbit gear means, said brake means comprising a brake arm somewhat ring-like in configuration and a plurality of anchoring sockets for securement with other nuts, bolt heads, lugs and the like, and said brake arm carrying said anchoring sockets.

10. A torque multiplication device in accordance with claim 9, wherein said brake arm further comprises a plurality of intermediate elements, saia brake arm carrying said intermediate elements, and each of said intermediate elements freely mounting in a rotary direction one of said anchoring sockets.

11. A torque multiplication device in accordance with claim 10, wherein are further provided ring gears and locking screw means, wherein each of said anchoring sockets carries said locking screw means, wherein each of said anchoring sockets freely mounts in a rotary direction one of said ring gears, wherein each of said ring gears operatively engages said locking screw means to advance inwardly said locking screw means for locking engagement of said locking screw means with the faces of such other nut, lug, bolt head and the like or to withdraw outwardly said locking screw means for release from such locking engagement.

* * * * *